United States Patent
Rossi et al.

(10) Patent No.: US 11,699,097 B2
(45) Date of Patent: Jul. 11, 2023

(54) MACHINE LEARNING MODEL WITH CONDITIONAL EXECUTION OF MULTIPLE PROCESSING TASKS

(71) Applicant: Apple Inc., Cupertino, CA (US)

(72) Inventors: Francesco Rossi, Sunnyvale, CA (US); Vignesh Jagadeesh, San Jose, CA (US); Vinay Sharma, Palo Alto, CA (US); Marco Zuliani, San Jose, CA (US); Xiaojin Shi, Cupertino, CA (US); Benjamin Poulain, San Jose, CA (US)

(73) Assignee: APPLE INC., Cupertino, CA (US)

( * ) Notice: Subject to any disclaimer, the term of this patent is extended or adjusted under 35 U.S.C. 154(b) by 349 days.

(21) Appl. No.: 16/878,254

(22) Filed: May 19, 2020

(65) Prior Publication Data
US 2020/0372408 A1    Nov. 26, 2020

Related U.S. Application Data

(60) Provisional application No. 62/850,618, filed on May 21, 2019.

(51) Int. Cl.
*G06N 20/00*      (2019.01)
*G06F 9/38*       (2018.01)

(52) U.S. Cl.
CPC .......... *G06N 20/00* (2019.01); *G06F 9/3885* (2013.01)

(58) Field of Classification Search
CPC .......... G06N 20/00; G06N 3/08; G06N 7/005; G06F 9/3885; G06F 17/18; G06F 15/18
See application file for complete search history.

(56) References Cited

U.S. PATENT DOCUMENTS

| | | | |
|---|---|---|---|
| 5,369,773 A | 11/1994 | Hammerstrom | |
| 5,483,620 A | 1/1996 | Pechanek et al. | |
| 9,286,524 B1 | 3/2016 | Mei et al. | |
| 10,580,430 B2* | 3/2020 | Jain | G10L 21/0364 |
| 2010/0191391 A1 | 7/2010 | Zeng | |
| 2017/0132528 A1* | 5/2017 | Aslan | G06N 20/00 |
| 2017/0193368 A1 | 7/2017 | Le Grand et al. | |
| 2018/0060759 A1* | 3/2018 | Chu | G06N 20/00 |
| 2018/0088996 A1 | 3/2018 | Rossi et al. | |

(Continued)

FOREIGN PATENT DOCUMENTS

WO      2018140969 A1      8/2018

OTHER PUBLICATIONS

Liu, Lanlan, et. al., "Dynamic Deep Neural Networks: Optimizing Accuracy-Efficiency Trade-Offs by Selective Execution", Mar. 5, 2018, https://arxiv.org/pdf/1701.00299.pdf (12 pp).

(Continued)

*Primary Examiner* — Rasheed Gidado
(74) *Attorney, Agent, or Firm* — Young Basile Hanlon & MacFarlane, P.C.

(57) ABSTRACT

A method includes receiving input data at a trained machine learning model that includes a common part and task-specific parts, receiving an execution instruction that identifies one or more processing tasks to be performed, processing the input data using the common part of the trained machine learning model to generate intermediate data, and processing the intermediate data using one or more of the task-specific parts of the trained machine learning model based on the execution instruction to generate one or more outputs.

22 Claims, 5 Drawing Sheets

(56) References Cited

U.S. PATENT DOCUMENTS

| | | | |
|---|---|---|---|
| 2018/0157972 A1* | 6/2018 | Hu | G06T 1/0007 |
| 2018/0174047 A1* | 6/2018 | Bourdev | G06N 3/08 |
| 2018/0293486 A1 | 10/2018 | Bajic et al. | |
| 2018/0314946 A1 | 11/2018 | Bajic et al. | |
| 2018/0336463 A1* | 11/2018 | Bloom | G06N 3/0454 |
| 2018/0349189 A1 | 12/2018 | Rossi et al. | |
| 2019/0050224 A1 | 2/2019 | Bajic et al. | |
| 2019/0065944 A1* | 2/2019 | Hotson | G06N 3/084 |
| 2019/0311265 A1* | 10/2019 | Tamaazousti | G06N 3/08 |
| 2020/0019854 A1* | 1/2020 | Abraham | G06F 9/4843 |
| 2021/0266383 A1* | 8/2021 | Bito | H04L 67/42 |

OTHER PUBLICATIONS

International Search Report and Written Opinion dated Aug. 25, 2020, in International Application No. PCT/US2020/033750 (16 pp).

\* cited by examiner

MACHINE LEARNING MODEL WITH CONDITIONAL EXECUTION OF MULTIPLE PROCESSING TASKS

CROSS-REFERENCE TO RELATED APPLICATIONS

This application claims the benefit of U.S. patent application Ser. No. 62/850,618, filed on May 21, 2019, the content of which is hereby incorporated by reference in its entirety for all purposes.

TECHNICAL FIELD

This disclosure relates to machine learning models with conditional execution of multiple processing tasks.

BACKGROUND

Machine learning models, such as deep neural networks, are typically configured to perform a single task. As an example, when three processing tasks are to be performed using a single set of input data, the three tasks are typically performed by three neural networks, each of which handles one of the tasks.

SUMMARY

One aspect of the disclosure is a method that includes receiving input data at a trained machine learning model that includes a common part and task-specific parts, receiving an execution instruction that identifies one or more processing tasks to be performed, processing the input data using the common part of the trained machine learning model to generate intermediate data, and processing the intermediate data using one or more of the task-specific parts of the trained machine learning model based on the execution instruction to generate one or more outputs.

In some implementations of the method, processing the intermediate data using the one or more of the task-specific parts of the trained machine learning model based on the execution instruction includes evaluating a conditional instruction for each of the task-specific parts of the trained machine learning model to determine whether to initiate execution of each of the task-specific parts of the trained machine learning model.

In some implementations of the method, processing the intermediate data using the one or more of the task-specific parts of the trained machine learning model based on the execution instruction includes causing execution of one or more of the task-specific parts of the trained machine learning model based on the execution instruction.

In some implementations of the method, processing the intermediate data using the one or more of the task-specific parts of the trained machine learning model based on the execution instruction includes suppressing execution of one or more of the task-specific parts of the trained machine learning model based on the execution instruction.

In some implementations of the method, processing the intermediate data using the one or more of the task-specific parts of the trained machine learning model based on the execution instruction includes loading only the one or more or the task-specific parts of the trained machine learning model that are identified by the execution instruction.

In some implementations of the method, processing the intermediate data using the one or more of the task-specific parts of the trained machine learning model based on the execution instruction includes unloading at least some of the task-specific parts of the trained machine learning model.

The method may also include defining a linear execution order including the common part of the trained machine learning model and the one or more of the task-specific parts of the trained machine learning model based on the execution instruction. In such an implementation, processing the input data using the common part of the trained machine learning model and processing the intermediate data using the one or more of the task-specific parts of the trained machine learning model is performed according to the linear execution order.

In some implementations of the method, the one or more of the task-specific parts of the trained machine learning model include a first task-specific part of the trained machine learning model and a second task-specific part of the trained machine learning model, and processing the intermediate data using the one or more of the task-specific parts of the trained machine learning model based on the execution instruction includes executing the first task-specific part of the trained machine learning model and the second task-specific part of the trained machine learning model in series.

In some implementations of the method, the one or more of the task-specific parts of the trained machine learning model include a first task-specific part of the trained machine learning model and a second task-specific part of the trained machine learning model, and processing the intermediate data using the one or more of the task-specific parts of the trained machine learning model based on the execution instruction includes executing the first task-specific part of the trained machine learning model and the second task-specific part of the trained machine learning model in parallel.

Another aspect of the disclosure is a non-transitory computer-readable storage device including program instructions executable by one or more processors. The program instructions, when executed, cause the one or more processors to perform operations. The operations include receiving input data at a trained machine learning model that includes a common part and task-specific parts, receiving an execution instruction that identifies one or more processing tasks to be performed, processing the input data using the common part of the trained machine learning model to generate intermediate data, and processing the intermediate data using one or more of the task-specific parts of the trained machine learning model based on the execution instruction to generate one or more outputs.

Another aspect of the disclosure is a system that includes a memory and a processor. The processor is configured to execute instructions that are stored in the memory. The instructions, when executed by the processor, cause the processor to receive input data at a trained machine learning model that includes a common part and task-specific parts, receive an execution instruction that identifies one or more processing tasks to be performed, process the input data using the common part of the trained machine learning model to generate intermediate data, and process the intermediate data using one or more of the task-specific parts of the trained machine learning model based on the execution instruction to generate one or more outputs.

DETAILED DESCRIPTION

When multiple processing tasks are performed using separate neural networks (e.g., deep neural networks), each has its own memory footprint, and serial processing of the tasks may be required. When related tasks use a common set of input data, or significantly overlapping sets of input data, some of the processing tasks may be redundant. For example, each network may perform a similar set of processing operations before performing distinct processing operations that specific to the respective processing task.

The systems and methods that are described herein relate to neural networks that are able to perform two or more processing tasks using a single set of input data and a common set of initial layers. An initial portion of the neural network performs procession operations that are common to all of the two or more processing tasks. The output of the initial portion of the input data is provided as an input to two or more network portions that each perform processing operations that are required by fewer than all of the processing tasks. The network portions are executed conditionally. If one of the processing tasks is not needed with respect to a certain set of the input data, that processing task can be skipped or otherwise excluded from execution.

Figure 1:
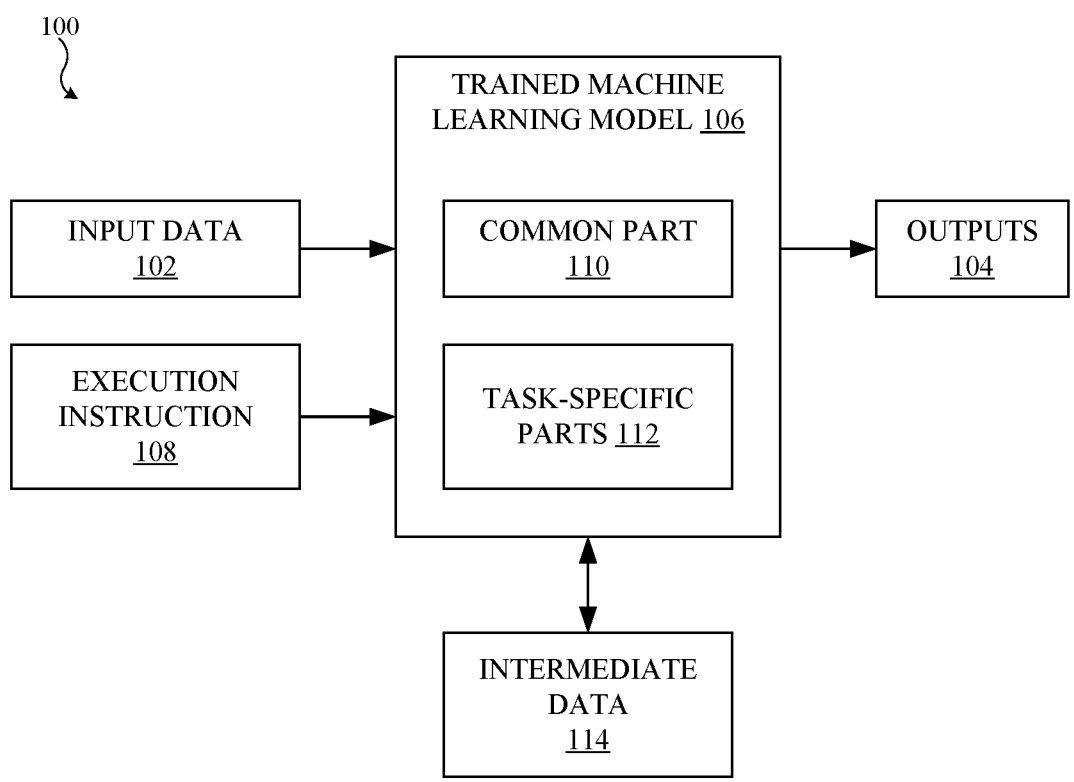
FIG. 1 is a block diagram that shows a processing system that includes a trained machine learning model.

FIG. 1 is a block diagram that shows a processing system 100. The processing system 100 utilizes input data 102 to generate outputs 104 using a trained machine learning model 106. Operation of the trained machine learning model 106 is controlled by an execution instruction 108. As will be explained herein, the execution instruction 108 controls how the input data 102 is processed by a common part 110 of the trained machine learning model 106 and by task-specific parts 112 of the trained machine learning model 106. During operation of the trained machine learning model 106, the common part 110 of the trained machine learning model 106 and the task-specific parts 112 of the trained machine learning model 106 may generate intermediate data 114 which can be saved and loaded by the trained machine learning model 106 as needed.

The input data 102 is a data item or collection of data that is stored in a format that can be processed by the trained machine learning model 106. The input data 102 may be provided directly to the trained machine learning model 106, or may be subjected to one or more preprocessing operations before use by the trained machine learning model 106. Many types of information can be used as or included in the input data 102 depending on the processing tasks that the processing system 100 is configured to perform. As an example, the input data 102 may be or include an image (e.g., a digital image defined by an array of pixels that each have a color expressed by component values or by an index value) in implementations in which the processing tasks include image analysis tasks such as object detection.

The outputs 104 are the results obtained by processing tasks that are performed by the processing system 100, and these results are dependent on the input data. The outputs 104 are information that is understandable to human operators or high-level processing tasks, and this information is intended to be utilized by processes other than the processing system 100 or by human operators. The outputs 104 may be verifiable relative to an objective criterion, to allow assessment of whether the outputs 104 are correct or incorrect. For example, in implementations in which the processing system 100 is configured to detect objects in images, the outputs 104 may include a label (e.g., descriptive text) that identifies a type of object that is present in the image and a location (e.g., a center point or a bounding box) relative to the image where the object is present.

The processing system 100 can be used to perform multiple processing tasks. During processing of a particular instance of the input data 102 by the processing system 100, a set of one or more of the processing tasks can be chosen for execution using the execution instruction 108, and the outputs 104 that are generated by execution of the processing system 100 are therefore dependent on the particular processing tasks that are performed during execution of the processing system 100.

The processing system 100 performs the multiple processing tasks in dependence on the execution instruction 108 using the trained machine learning model 106. The trained machine learning model 106 includes the common part 110 and the task-specific parts 112. The common part 110 and the task-specific parts 112 are each groups of one or more operations that are grouped according to their relevance to the processing tasks that will be performed by the processing system 100. The common part 110 of the machine learning model 106 includes operations that are relevant to all tasks that will be performed by the processing system 100. The task-specific parts 112 each include one or more operations that are either relevant to a single processing task that will be performed by the processing system 100, or to two or more processing tasks that will be performed by the processing system 100.

As an example, the trained machine learning model 106 may be a deep neural network, in which the common part 110 of the trained machine learning model 106 has one or more layers of processing units (e.g., neurons) and the task-specific parts 112 of the trained machine learning model 106 each have one or more layers of processing units (e.g., neurons). The one or more layers of the common part 110 of the trained machine learning model 106 include an input layer that is configured to receive the input data 102. At least some of the task-specific parts 112 of the trained machine learning model 106 include an output layer that is configured to generate one or more of the outputs 104.

During operation of the processing system 100, the trained machine learning model 106 may generate the intermediate data 114. The intermediate data 114 is an output that is produced by a part of the trained machine learning model 106, such as the common part 110 or the task-specific parts 112 of the trained machine learning model 106. However, the intermediate data 114 is distinguishable from the outputs 104 in that the information contained in the intermediate data 114 is not readily understandable by persons or by systems other than the trained machine learning model 106, and is not representative of a result intended for any of the processing tasks. Instead, the intermediate data 114 includes values generated by part of the trained machine learning model 106, such as the common part 110 or one of the task-specific parts 112, and is intended to be processed further by one or more of the task-specific parts 112 of the trained machine learning model 106. As an example, the intermediate data 114 may include values output by the processing units (e.g., values generated by neurons before or after modification by an activation function) of a layer (e.g., a hidden layer) that is included in the common part 110 of the trained machine learning model 106 or in one of the task-specific parts 112 of the trained machine learning model 106.

Training of the trained machine learning model 106 may be performed using conventional training techniques. The common parts 110 and the task-specific parts 112 may be defined later by determining relevance boundaries between parts of the trained machine learning model 106.

Figure 2:
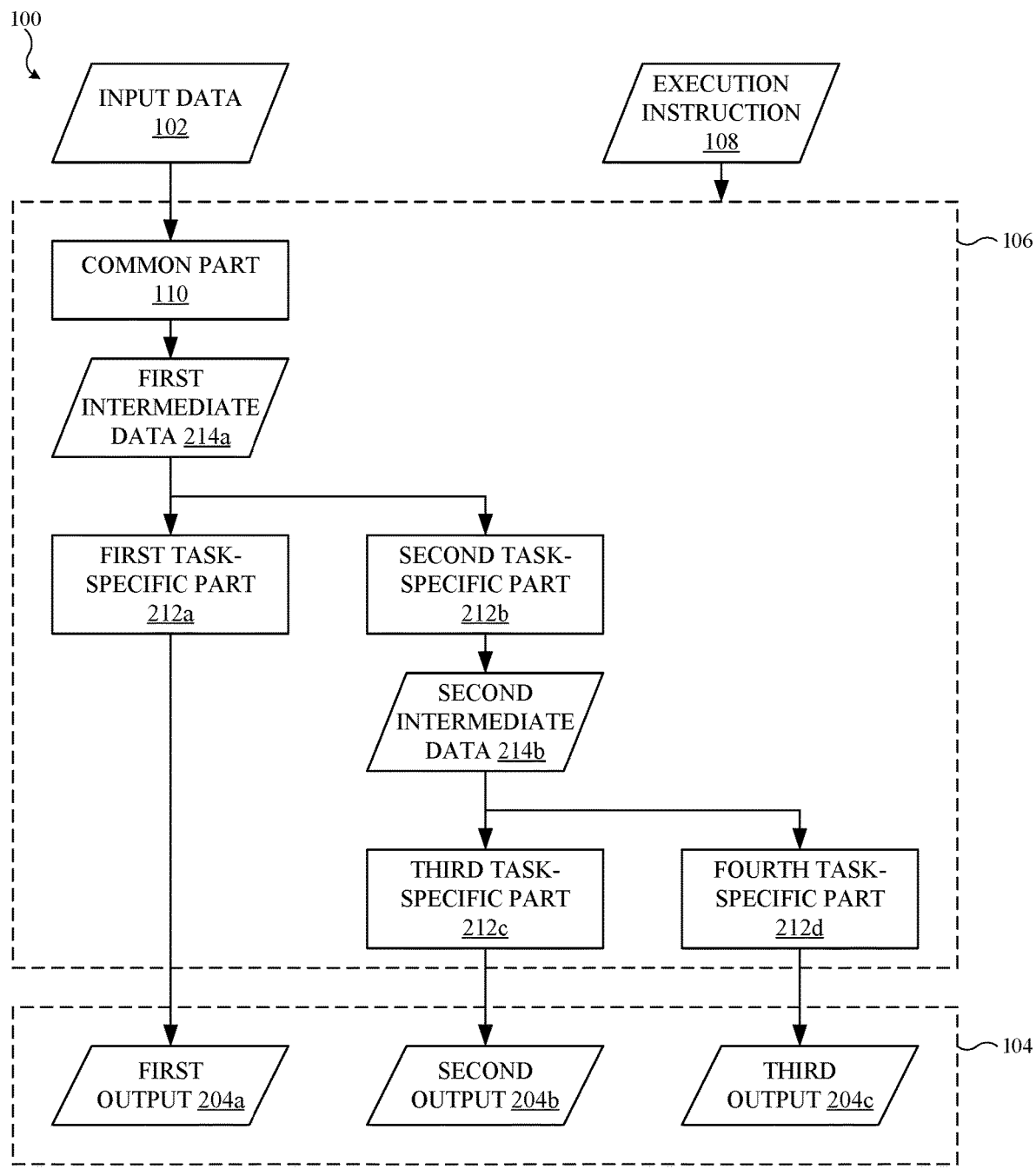
FIG. 2 is an illustration that shows an example of functional relationships and data dependencies between parts of an implementation of the trained machine learning model.

FIG. 2 is an illustration that shows an example of functional relationships and data dependencies between parts of an example of an implementation of the trained machine learning model 106. In the illustrated example, the trained machine learning model 106 is configured to perform three different processing tasks, which are referred to herein as a first processing task, a second processing task, and a third processing task. When the trained machine learning model 106 is executed (i.e., processing of input data commences) some or all of these processing tasks can be selected for use, and the processing tasks that are not selected are not performed.

In this example, the trained machine learning model 106 includes the common part 110 and the task-specific parts 112, as previously described. The task-specific parts 112 of the trained machine learning model include a first task-specific part 212a, a second task-specific part 212b, a third task-specific part 212c, and a fourth task-specific part 212d. The intermediate data 114 includes first intermediate data 214a and second intermediate data 214b. The outputs 104 include a first output 204a that is associated with the first processing task, a second output 204b that is associated with the second processing task, and a third output 204c that is associated with the third processing task.

The common part 110 receives the input data 102 as an input and processes it. To process the input data 102, the common part 110 may be configured as a portion of a deep neural network, including layers (e.g., an input layer and one or more hidden layers) of processing elements (e.g., neurons). The output of the common part 110 is the first intermediate data 214a.

The first task-specific part 212a receives the first intermediate data 214a as an input and processes it. To process the first intermediate data 214a, the first task-specific part 212a may be a portion of a deep neural network, including one or more layers (e.g., hidden layers and an output layer) of processing elements (e.g., neurons). The output of the first task-specific part 212a is the first output 204a.

The second task-specific part 212b receives the first intermediate data 214a as an input and processes it. To process the first intermediate data 214a, the second task-specific part 212b may be a portion of a deep neural network, including one or more layers (e.g., hidden layers) of processing elements (e.g., neurons). The output of the second task-specific part 212b is the second intermediate data 214b.

The third task-specific part 212c receives the second intermediate data 214b as an input and processes it. To process the second intermediate data 214b, the third task-specific part 212c may be a portion of a deep neural network, including one or more layers (e.g., hidden layers and an output layer) of processing elements (e.g., neurons). The output of the third task-specific part 212c is the second output 204b.

The fourth task-specific part 212d receives the second intermediate data 214b as an input and processes it. To process the second intermediate data 214b, the fourth task-specific part 212d may be a portion of a deep neural network, including one or more layers (e.g., hidden layers and an output layer) of processing elements (e.g., neurons). The output of the fourth task-specific part 212d is the third output 204c.

From the foregoing, it can be seen that the first processing task, the second processing task, and the third processing each include a distinct set of operations, but there is some overlap between all of them. The first processing operation requires execution of the common part 110 and the first task-specific part 212a to generate the first output 204a. The second processing operation requires execution of the common part 110, the second task-specific part 212b, and the third task-specific part 212c to generate the second output 204b. The third processing operation requires execution of the common part 110, the second task-specific part 212b, and the fourth task-specific part 212d to generate the third output 204c. Thus, the common part 110 is executed whenever any of the processing tasks is performed, the first task-specific part 212a is executed only when the first processing task is performed, the second task-specific part 212b is executed when either of the second processing task or the third processing task are performed, the third task-specific part 212c is executed only when the second processing task is performed, and the fourth task-specific part 212d is executed only when the third processing task is performed.

The execution instruction 108 can include information that indicates which processing tasks are to be performed. During operation of the trained machine learning model 106, the execution instruction 108 is used to control whether each of the task-specific parts 112 of the trained machine learning model 106 is executed. The execution instruction does not need to include a direct selection of any particular part of the trained machine learning model 106. For example, the execution instruction 108 may describe processing tasks to be performed in terms of a list of outputs that are of interest, and the execution of the task specific parts of the trained machine learning model 106 can be controlled based on the execution instruction 108 to execute those task-specific parts of the trained machine learning model 106 that are needed to generate the outputs specified by the execution instruction 108.

As one example, the execution instruction 108 may indicate which processing tasks are to be performed, and conditional instructions (e.g., an if statement or other conditional operation) may be evaluated to determine whether to execute each of the task-specific parts in a serial operation in which the parts of the machine learning model 106 are executed one at a time in an order determined by data dependencies. Thus, in the current example, the common part 110 is executed, a first conditional instruction causes execution of the first task-specific part 212a if the first processing task is active, a second conditional instruction causes execution of the second task-specific part 212b if either of the second or third processing tasks are active, a third conditional instruction causes execution of the third task-specific part 212c if the second processing task is active, and a fourth conditional instruction causes execution of the fourth task-specific part 212d if the third processing task is active.

As another example, the execution instruction 108 may indicate which processing tasks are to be performed, and the execution instruction 108 is used to configure the trained machine learning model 106 prior to execution by loading and/or unloading parts of the trained machine learning model 106 based on the execution instruction 108. This results in a linear program for each possible combination of processing tasks, and the execution instruction 108 need only be evaluated once, prior to execution of the trained machine learning model 106.

Thus, in the current example, if only the first processing task is to be performed, the common part 110 and the first task-specific part 212a are loaded, all other parts are unloaded, and the trained machine learning model is then executed to process the input data 102 and generate the first output 204a. If only the second processing task is to be performed, the common part 110, the second task-specific part 212b, and the third task-specific part 212c are loaded, all other parts are unloaded, and the trained machine learning model is then executed to process the input data 102 and generate the second output 204b. If only the third processing task is to be performed, the common part 110, the second task-specific part 212b, and the fourth task-specific part 212d are loaded, all other parts are unloaded, and the trained machine learning model is then executed to process the input data 102 and generate the third output 204c. If the first processing task and the second processing task are to be performed, the common part 110, the first task-specific part 212a, the second task-specific part 212b, and the third task-specific part 212c are loaded, all other parts are unloaded, and the trained machine learning model is then executed to process the input data 102 and generate the first output 204a and the second output 204b. If the first processing task and the third processing task are to be performed, the common part 110, the first task-specific part 212a, the second task-specific part 212b, and the fourth task-specific part 212d are loaded, all other parts are unloaded, and the trained machine learning model is then executed to process the input data 102 and generate the first output 204a and the third output 204c. If the second processing task and the third processing task are to be performed, the common part 110, the second task-specific part 212b, the third task-specific part 212c, and the fourth task-specific part 212d are loaded, all other parts are unloaded, and the trained machine learning model is then executed to process the input data 102 and generate the second output 204b and the third output 204c. If the first processing task, the second processing task, and the third processing task are to be performed, the common part 110, first task-specific part 212a, the second task-specific part 212b, the third task-specific part 212c, and the fourth task-specific part 212d are loaded and the trained machine learning model is then executed to process the input data 102 and generate the first output 204a, the second output 204b, and the third output 204c.

In some implementations, the parts of the machine learning model 106 are all executed in series. In other implementations, parts of the machine learning model 106 may be executed in parallel. Parallel execution can be performed using a single processor or multiple processors, and/or using a single computing device or multiple computing devices. In the current example, if the first and second processing tasks are active, the common part 110 is executed and the first intermediate data 214a is generated and stored. As computing resources become available tasks associated with each of the first processing task and the second processing task can be executed in parallel. In particular, the first processing task can be continued by initiating execution of the first task-specific part 212a using the first intermediate data 214a when a first processing resource (e.g., one or more processors or processing cores) becomes available. When a second processing resource becomes available, the second processing task can be continued by executing the second task-specific part 212b and the third task-specific part 212c in parallel with execution of the first task-specific part 212a.

Figure 3:
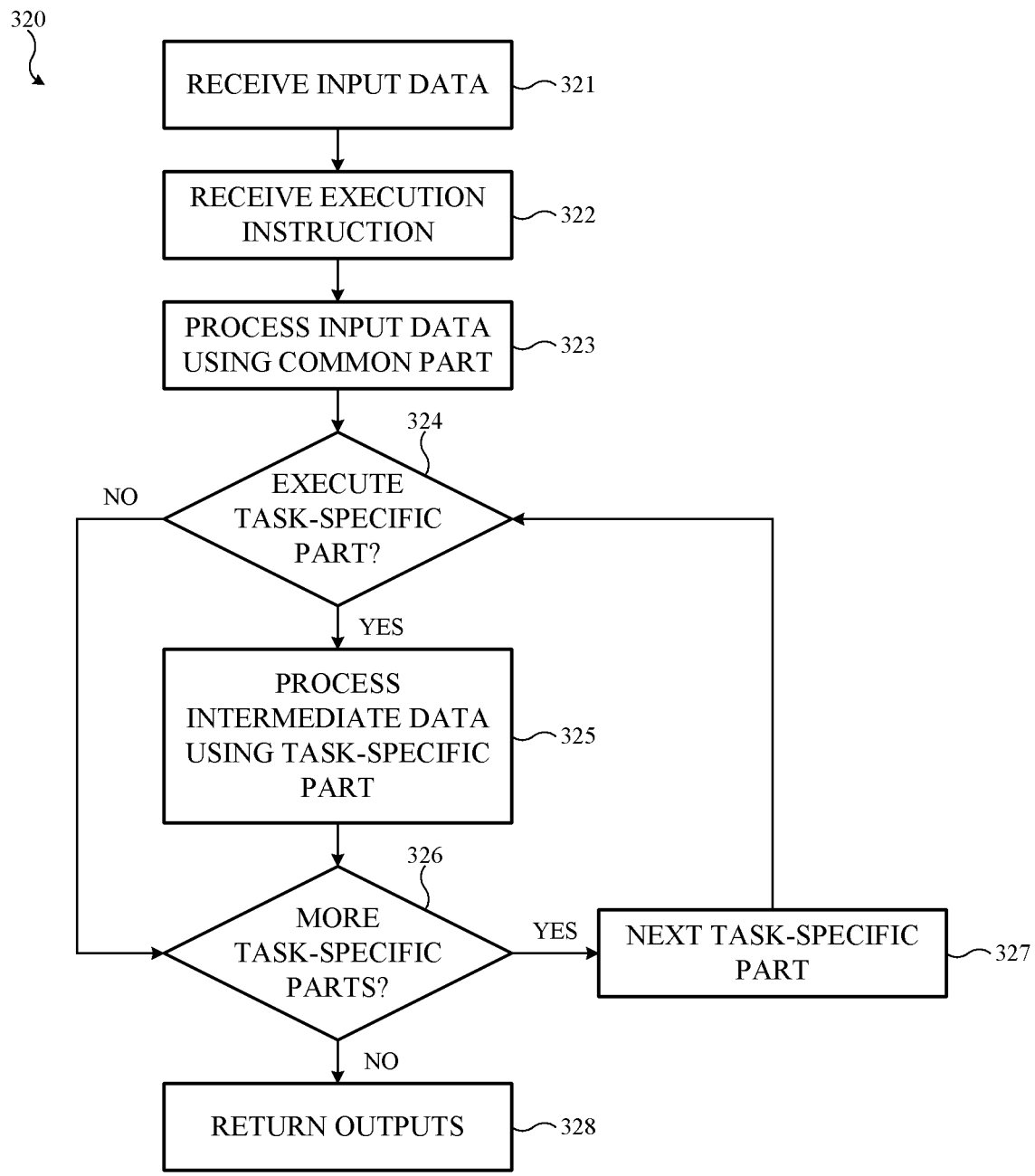
FIG. 3 is a flowchart that shows a first example of a process for performing processing tasks.

FIG. 3 is a flowchart that shows a first example of a process 320 for performing processing tasks. The process 320 may be implemented using a computing device. As one example, a computing device may include a processor, a memory, and computer-interpretable instructions that are stored in the memory and accessible to the processor, wherein the instructions, when executed by the processor, cause the processor to perform the operations of the process 320. In some implementations, the process 320 is implemented in the form of a computer readable storage device that includes computer-interpretable program instructions that cause operation of the process 320 when executed.

Operation 321 includes receiving the input data 102 at the trained machine learning model 106, which includes the common part 110 and the task-specific parts 112. As previously discussed, many different types of data may be or be included in the input data 102. As examples, input data 102 can be received by being passed in a function call, by being accessed from storage, or received in a transmission.

Operation 322 includes receiving the execution instruction 108. The execution instruction 108 identifies one or more processing tasks to be performed by the trained machine learning model, as previously described. The execution instruction 108 can be data in any form. As examples, the execution instruction 108 can be received by being passed in a function call, by being accessed from storage, or received in a transmission.

Operation 323 includes processing the input data using the common part 110 of the trained machine learning model 106 to generate intermediate data. Operation of the common part 110 is as previously discussed.

Operation 324 includes evaluating one of the task-specific parts 112 of the trained machine learning model 106 to determine whether it will be executed. Operation 324 is performed using the execution instruction 108. If the determination indicates that the task-specific part 112 being evaluated should be executed, the process proceeds to operation 325. Otherwise, the process proceeds to operation 326.

By advancing the process to operation 325, the evaluation made in operation 324 causes execution of one or more of the task-specific parts 112 of the trained machine learning model 106 based on the execution instruction 108. By skipping operation 325 and instead advancing the process to operation 326, the evaluation made in operation 324 suppresses execution of one or more of the task-specific parts 112 of the trained machine learning model 106 based on the execution instruction 108.

Operation 324 may include evaluating a conditional instruction for each of the task-specific parts 112 of the trained machine learning model 106 to determine whether to initiate execution of each of the task-specific parts 112 of the trained machine learning model 106. This evaluation can be performed using information contained in the execution instruction 108. For example, the execution instruction 108 may indicate that a first processing operation is active, and the conditional instruction may state that the task-specific part 112 that is currently being evaluated should be executed if the first processing operation is active.

Operation 325 includes processing the intermediate data using the task-specific part 112 of the trained machine learning model 106 per the determination made in operation 324 based on the execution instruction 108. The task-specific part 112 is processed to generate a further instance of the intermediate data 114 or to generate one of the outputs 104, dependent upon the operations that are included in the task-specific part 112 that is currently being evaluated and based on the overall configuration of the trained machine learning model 106. Operation of the task-specific part 112 is as previously discussed.

Together, operations 324 and 325, over a single iteration or multiple iterations, cause the trained machine learning model 106 to processing the intermediate data 114 using one or more of the task-specific parts 112 of the trained machine learning model 106 based on the execution instruction 108 to generate one or more of the outputs 104.

By advancing the process to operation 325, the evaluation made in operation 324 causes execution of one or more of the task-specific parts 112 of the trained machine learning model 106 based on the execution instruction 108. By skipping operation 325 and instead advancing the process to operation 326, the evaluation made in operation 324 suppresses execution of one or more of the task-specific parts 112 of the trained machine learning model 106 based on the execution instruction 108.

Operation 324 may include evaluating a conditional instruction for each of the task-specific parts 112 of the trained machine learning model 106 to determine whether to initiate execution of each of the task-specific parts 112 of the trained machine learning model 106. This evaluation can be performed using information contained in the execution instruction 108. For example, the execution instruction 108 may indicate that a first processing operation is active, and the conditional instruction may state that the task-specific part 112 that is currently being evaluated should be executed if the first processing operation is active.

In some implementations of operations 324 and 325, processing the intermediate data 114 using the one or more of the task-specific parts 112 of the trained machine learning model 106 based on the execution instruction 108 includes loading only the one or more or the task-specific parts 112 of the trained machine learning model 106 that are identified by the execution instruction 108. This identification may explicitly identify the part of the model (e.g., by an identifying code) or may implicitly identify the part of the model, such as by identifying a processing task that requires execution of the part of the model.

In some implementations of operations 324 and 325, processing the intermediate data 114 using the one or more of the task-specific parts 112 of the trained machine learning model 106 based on the execution instruction 108 includes unloading at least some of the task-specific parts 112 of the trained machine learning model 106.

In operation 326 a determination is made as to whether more of the task-specific parts 112 remain to be processed. If more of the task specific parts remain to be processed, the next one of the task specific parts is selected in operation 327 and the process returns to operation 324. If no more of the task-specific parts remain to be processed, the process proceeds to operation 328 in which the outputs 104 are returned to the process that initiated execution of the trained machine learning model 106. Returning the outputs 104 may include, as examples, storing, displaying, transmitting, or further processing the outputs 104.

In some implementations of the process 320, the one or more of the task-specific parts 112 of the trained machine learning model 106 include a first task-specific part of the trained machine learning model 106 and a second task-specific part of the trained machine learning model 106, and processing the intermediate data 114 using the one or more of the task-specific parts of the trained machine learning model 106 based on the execution instruction 108 includes executing the first task-specific part of the trained machine learning model 106 and the second task-specific part of the trained machine learning model 106 in series.

In some implementations of the process 320, the one or more of the task-specific parts 112 of the trained machine learning model 106 include a first task-specific part of the trained machine learning model 106 and a second task-specific part of the trained machine learning model 106, and processing the intermediate data 114 using the one or more of the task-specific parts of the trained machine learning model 106 based on the execution instruction 108 includes executing the first task-specific part of the trained machine learning model 106 and the second task-specific part of the trained machine learning model 106 in parallel.

Figure 4:
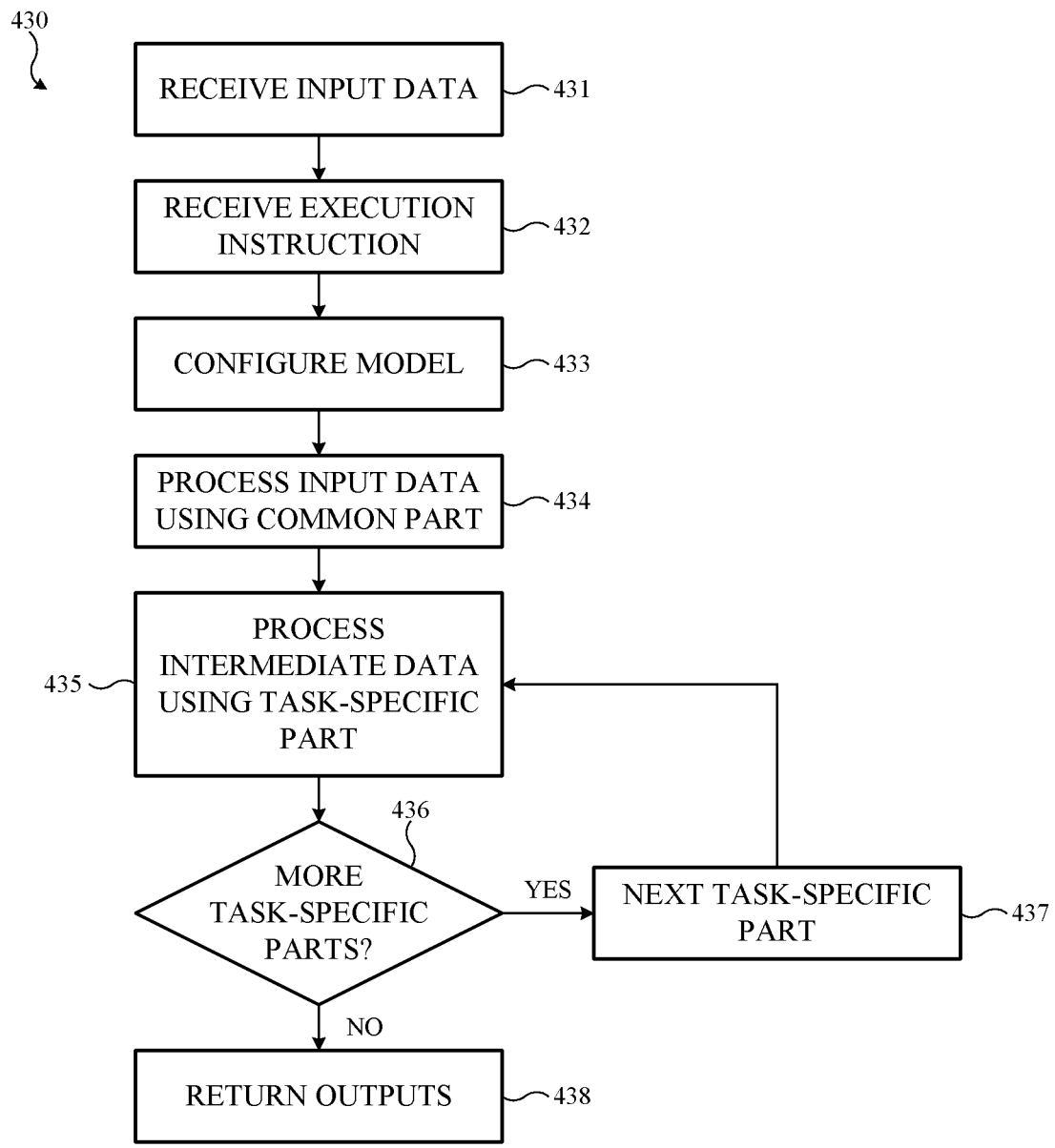
FIG. 4 is a flowchart that shows a second example of a process for performing processing tasks.

FIG. 4 is a flowchart that shows a process 430 for performing processing tasks. The process 430 may be implemented using a computing device. As one example, a computing device may include a processor, a memory, and computer-interpretable instructions that are stored in the memory and accessible to the processor, wherein the instructions, when executed by the processor, cause the processor to perform the operations of the process 430. In some implementations, the process 430 is implemented in the form of a computer readable storage device that includes computer-interpretable program instructions that cause operation of the process 430 when executed.

Operation 431 includes receiving the input data 102 at the trained machine learning model 106, which includes the common part 110 and the task-specific parts 112. As previously discussed, many different types of data may be or be included in the input data 102. As examples, input data 102 can be received by being passed in a function call, by being accessed from storage, or received in a transmission.

Operation 432 includes receiving the execution instruction 108. The execution instruction 108 identifies one or more processing tasks to be performed by the trained machine learning model, as previously described. The execution instruction 108 can be data in any form. As examples, the execution instruction 108 can be received by being passed in a function call, by being accessed from storage, or received in a transmission.

Operation 433 includes configuring the machine learning model 106 using the execution instruction 108. The machine learning model 106 may be configured such that it only includes the parts necessary for execution of the processing tasks that are to be performed by the trained machine learning model 106, as represented by the execution instruction 108. Configuring the machine learning model 106 in operation 433 can include conditionally loading or unloading parts of the trained machine learning model that are needed. Configuring the machine learning model 106 in operation 433 can include defining a version of the trained machine learning model 106 that requires needed parts as described by the execution instructions. Configuration of the machine learning model 106 is performed according to operation 433 prior to the time at which processing the input data 102 using the common part 110 and the task-specific parts 112 commences. Accordingly, conditional operators need not be evaluated during processing the input data 102 using the common part 110 and the task-specific parts 112 to determine which parts should be executed.

Operation 434 includes processing the input data using the common part 110 of the trained machine learning model 106 to generate intermediate data. Operation of the common part 110 is as previously discussed.

Operation 435 includes processing the intermediate data using the task-specific part 112 of the trained machine learning model 106 per the determination made in operation 434 based on the execution instruction 108. The task-specific part 112 is processed to generate a further instance of the intermediate data 114 or to generate one of the outputs 104, dependent upon the operations that are included in the task-specific part 112 that is currently being evaluated and based on the overall configuration of the trained machine learning model 106. Operation of the task-specific part 112 is as previously discussed.

Together, operations 433 and 435, over a single iteration or multiple iterations, cause the trained machine learning model 106 to processing the intermediate data 114 using one or more of the task-specific parts 112 of the trained machine learning model 106 based on the execution instruction 108 to generate one or more of the outputs 104.

In some implementations of operations 433 and 435, processing the intermediate data 114 using the one or more of the task-specific parts 112 of the trained machine learning model 106 based on the execution instruction 108 includes loading only the one or more or the task-specific parts 112 of the trained machine learning model 106 that are identified by the execution instruction 108. Loading is performed during configuration of the trained machine learning model 106 in operation 433. This identification may explicitly identify the part of the model (e.g., by an identifying code) or may implicitly identify the part of the model, such as by identifying a processing task that requires execution of the part of the model.

In some implementations of operations 433 and 435, processing the intermediate data 114 using the one or more of the task-specific parts 112 of the trained machine learning model 106 based on the execution instruction 108 includes unloading at least some of the task-specific parts 112 of the trained machine learning model 106. Unloading is performed during configuration of the trained machine learning model 106 in operation 433.

In some implementations, configuring the trained machine learning model 106 in operation 433 may also include defining a linear execution order including the common part 110 of the trained machine learning model 106 and the one or more of the task-specific parts 112 of the trained machine learning model 106 based on the execution instruction. In such an implementation, processing the input data 102 using the common part of the trained machine learning model in operation 434 and processing the intermediate data 114 using the one or more of the task-specific parts 112 of the trained machine learning model 106 is performed according to the linear execution order.

In operation 436, a determination is made as to whether more of the task-specific parts 112 remain to be processed. If more of the task specific parts 112 remain to be processed, the next one of the task specific parts is selected in operation 437 and the process returns to operation 435. If no more of the task-specific parts remain to be processed, the process proceeds to operation 438 in which the outputs 104 are returned to the process that initiated execution of the trained machine learning model 106. Returning the outputs 104 may include, as examples, storing, displaying, transmitting, or further processing the outputs 104.

In some implementations of the process 430, the one or more of the task-specific parts 112 of the trained machine learning model 106 include a first task-specific part of the trained machine learning model 106 and a second task-specific part of the trained machine learning model 106, and processing the intermediate data 114 using the one or more of the task-specific parts of the trained machine learning model 106 based on the execution instruction 108 includes executing the first task-specific part of the trained machine learning model 106 and the second task-specific part of the trained machine learning model 106 in series.

In some implementations of the process 430, the one or more of the task-specific parts 112 of the trained machine learning model 106 include a first task-specific part of the trained machine learning model 106 and a second task-specific part of the trained machine learning model 106, and processing the intermediate data 114 using the one or more of the task-specific parts of the trained machine learning model 106 based on the execution instruction 108 includes executing the first task-specific part of the trained machine learning model 106 and the second task-specific part of the trained machine learning model 106 in parallel.

Figure 5:
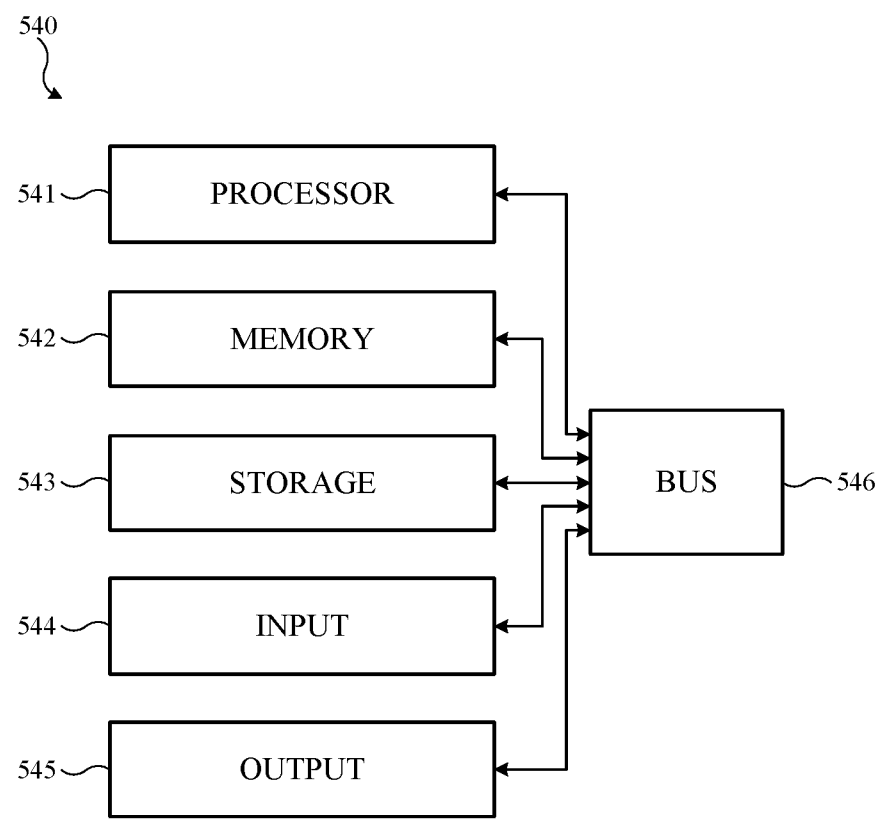
FIG. 5 is an illustration that shows an example of a hardware configuration for a computing device.

FIG. 5 is an illustration that shows an example of a hardware configuration for a computing device that can be used to implement the system described herein. The computing device 540 may include a processor 541, a memory 542, a storage device 543, one or more input devices 544, and one or more output devices 545. The computing device 540 may include a bus 546 or a similar device to interconnect the components for communication. The processor 541 is operable to execute computer program instructions and perform operations described by the computer program instructions. As an example, the processor 541 may be a conventional device such as a central processing unit. The memory 542 may be a volatile, high-speed, short-term information storage device such as a random-access memory module. The storage device 543 may be a non-volatile information storage device such as a hard drive or a solid-state drive. The input devices 544 may include any type of human-machine interface such as buttons, switches, a keyboard, a mouse, a touchscreen input device, a gestural input device, or an audio input device. The output devices 545 may include any type of device operable to provide an indication to a user regarding an operating state, such as a display screen or an audio output.

As described above, one aspect of the present technology is the gathering and use of data available from various sources for processing by a neural network at training time and at run time. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to train neural networks to perform a number of processing tasks. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, systems that use the present technology can be configured to allow users to select to "opt in" or "opt out" of participation in the collection of personal information data during registration for services or anytime thereafter. In another example, users can select not to provide personal information to services that use the present technology. In yet another example, users can select to limit the length of time personal information is maintained by services that use the present technology, or users may entirely prohibit use of personal information by systems that use the present technology. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, neural networks may be trained and used based on non-personal information data or a bare minimum amount of personal information, such as the content being requested by the device associated with a user, other non-personal information available to the services that are using the present technology, or publicly available information.

What is claimed is:

1. A method, comprising:
receiving input data at a trained machine learning model that includes a common part and task-specific parts;
receiving an execution instruction at the trained machine learning model that identifies one or more processing tasks to be performed;
processing the input data using the common part of the trained machine learning model to generate intermediate data; and
processing the intermediate data using one or more of the task-specific parts of the trained machine learning model that correspond to the one or more processing tasks to be performed that are identified by the execution instruction to generate one or more outputs, wherein processing the intermediate data using the one or more of the task-specific parts of the trained machine learning model based on the execution instruction includes loading only the one or more of the task-specific parts of the trained machine learning model that are identified by the execution instruction.

2. The method of claim 1, wherein processing the intermediate data using the one or more of the task-specific parts of the trained machine learning model based on the execution instruction includes evaluating a conditional instruction for each of the task-specific parts of the trained machine learning model to determine whether to initiate execution of each of the task-specific parts of the trained machine learning model.

3. The method of claim 1, wherein processing the intermediate data using the one or more of the task-specific parts of the trained machine learning model based on the execution instruction includes causing execution of one or more of the task-specific parts of the trained machine learning model based on the execution instruction.

4. The method of claim 1, wherein processing the intermediate data using the one or more of the task-specific parts of the trained machine learning model based on the execution instruction includes suppressing execution of one or more of the task-specific parts of the trained machine learning model based on the execution instruction.

5. The method of claim 1, wherein processing the intermediate data using the one or more of the task-specific parts of the trained machine learning model based on the execution instruction includes unloading at least some of the task-specific parts of the trained machine learning model.

6. The method of claim 1, further comprising:
defining a linear execution order including the common part of the trained machine learning model and the one or more of the task-specific parts of the trained machine learning model based on the execution instruction, wherein processing the input data using the common part of the trained machine learning model and processing the intermediate data using the one or more of the task-specific parts of the trained machine learning model is performed according to the linear execution order.

7. The method of claim 1, wherein the one or more of the task-specific parts of the trained machine learning model include a first task-specific part of the trained machine learning model and a second task-specific part of the trained machine learning model, and processing the intermediate data using the one or more of the task-specific parts of the trained machine learning model based on the execution instruction includes executing the first task-specific part of the trained machine learning model and the second task-specific part of the trained machine learning model in series.

8. The method of claim 1, wherein the one or more of the task-specific parts of the trained machine learning model include a first task-specific part of the trained machine learning model and a second task-specific part of the trained machine learning model, and processing the intermediate data using the one or more of the task-specific parts of the trained machine learning model based on the execution instruction includes executing the first task-specific part of the trained machine learning model and the second task-specific part of the trained machine learning model in parallel.

9. The method of claim 1, wherein processing the intermediate data using the one or more of the task-specific parts of the trained machine learning model based on the execution instruction to generate the one or more outputs comprises selecting the one or more of the task-specific parts of the trained machine learning model based on the one or more processing tasks to be performed that are identified by the execution instruction.

10. The method of claim 1, wherein the execution instruction identifies the one or more processing tasks to be performed by including information that explicitly identifies the one or more of the task-specific parts of the trained machine learning model.

11. The method of claim 1, wherein the execution instruction identifies the one or more processing tasks to be performed by identifying the one or more outputs to be generated by the trained machine learning model.

12. The method of claim 1, wherein the input data and the execution instruction are received by the trained machine learning model as inputs.

13. A non-transitory computer-readable storage device including program instructions executable by one or more processors that, when executed, cause the one or more processors to perform operations, the operations comprising:
receiving input data at a trained machine learning model that includes a common part and task-specific parts;
receiving an execution instruction at the trained machine learning model that identifies one or more processing tasks to be performed;
processing the input data using the common part of the trained machine learning model to generate intermediate data; and
processing the intermediate data using one or more of the task-specific parts of the trained machine learning model that correspond to the one or more processing tasks to be performed that are identified by the execution instruction to generate one or more outputs, wherein processing the intermediate data using the one or more of the task-specific parts of the trained machine learning model based on the execution instruction includes loading only the one or more of the task-specific parts of the trained machine learning model that are identified by the execution instruction.

14. The non-transitory computer-readable storage device of claim 13, wherein processing the intermediate data using the one or more of the task-specific parts of the trained machine learning model based on the execution instruction includes evaluating a conditional instruction for each of the task-specific parts of the trained machine learning model to determine whether to initiate execution of each of the task-specific parts of the trained machine learning model.

15. The non-transitory computer-readable storage device of claim 13, wherein processing the intermediate data using the one or more of the task-specific parts of the trained machine learning model based on the execution instruction includes causing execution of one or more of the task-specific parts of the trained machine learning model based on the execution instruction and suppressing execution of one or more of the task-specific parts of the trained machine learning model based on the execution instruction.

16. The non-transitory computer-readable storage device of claim 13, wherein processing the intermediate data using the one or more of the task-specific parts of the trained machine learning model based on the execution instruction includes unloading at least some of the task-specific parts of the trained machine learning model.

17. The non-transitory computer-readable storage device of claim 13, the operations further comprising:
defining a linear execution order including the common part of the trained machine learning model and the one or more of the task-specific parts of the trained machine learning model based on the execution instruction, wherein processing the input data using the common part of the trained machine learning model and processing the intermediate data using the one or more of the task-specific parts of the trained machine learning model is performed according to the linear execution order.

18. A system, comprising:
a memory; and
a processor that is configured to execute instructions that are stored in the memory, wherein the instructions, when executed by the processor, cause the processor to:
receive input data at a trained machine learning model that includes a common part and task-specific parts;
receive an execution instruction at the trained machine learning model that identifies one or more processing tasks to be performed;
process the input data using the common part of the trained machine learning model to generate intermediate data; and
process the intermediate data using one or more of the task-specific parts of the trained machine learning model that correspond to the one or more processing tasks to be performed that are identified by the execution instruction to generate one or more outputs, wherein processing the intermediate data using the one or more of the task-specific parts of the trained machine learning model based on the execution instruction includes loading only the one or more of the task-specific parts of the trained machine learning model that are identified by the execution instruction.

19. The system of claim 18, wherein processing the intermediate data using the one or more of the task-specific parts of the trained machine learning model based on the execution instruction includes evaluating a conditional instruction for each of the task-specific parts of the trained machine learning model to determine whether to initiate execution of each of the task-specific parts of the trained machine learning model.

20. The system of claim 18, wherein processing the intermediate data using the one or more of the task-specific parts of the trained machine learning model based on the execution instruction includes causing execution of one or more of the task-specific parts of the trained machine learning model based on the execution instruction and suppressing execution of one or more of the task-specific parts of the trained machine learning model based on the execution instruction.

21. The system of claim 18, wherein processing the intermediate data using the one or more of the task-specific parts of the trained machine learning model based on the execution instruction includes unloading at least some of the task-specific parts of the trained machine learning model.

22. The system of claim 18, further comprising:
defining a linear execution order including the common part of the trained machine learning model and the one or more of the task-specific parts of the trained machine learning model based on the execution instruction, wherein processing the input data using the common part of the trained machine learning model and processing the intermediate data using the one or more of the task-specific parts of the trained machine learning model is performed according to the linear execution order.

\* \* \* \* \*